United States Patent [19]

Lyons et al.

[11] Patent Number: 5,606,125
[45] Date of Patent: Feb. 25, 1997

[54] MATERIAL LEVEL-INTERFACE CONTROL SYSTEM

[76] Inventors: Kevin Lyons; Steven Lyons, both of 2155 Tree La., Kingwood, Tex. 77339

[21] Appl. No.: 266,651

[22] Filed: Jun. 28, 1994

[51] Int. Cl.[6] ................................................. G03F 23/00
[52] U.S. Cl. ............................................. 73/293; 250/901
[58] Field of Search ..................... 73/292, 293; 250/900, 250/901, 902; 340/619

[56] References Cited

U.S. PATENT DOCUMENTS

| | | | |
|---|---|---|---|
| 3,995,168 | 1/1976 | Neuscheier | 250/577 |
| 4,410,020 | 10/1983 | Lorenz | 73/293 X |
| 4,449,403 | 12/1984 | McQueen | 73/295 |
| 4,694,161 | 3/1987 | Sackett | 250/231 R |
| 4,880,971 | 11/1989 | Danisch | 73/293 X |
| 5,029,471 | 4/1991 | Goodrich | 73/293 |
| 5,103,648 | 4/1992 | Barbier | 73/293 X |
| 5,159,834 | 11/1992 | Eisele | 73/293 |
| 5,161,411 | 11/1992 | Cruickshank | 73/293 |
| 5,164,606 | 11/1992 | Secord | 250/577 |
| 5,226,320 | 7/1993 | Dages et al. | 73/292 X |
| 5,274,245 | 12/1993 | Lee | 73/293 X |
| 5,319,973 | 6/1994 | Crayton et al. | 73/292 X |
| 5,367,175 | 11/1994 | Bobb | 73/293 X |
| 5,381,022 | 1/1995 | Nemeth et al. | 73/293 X |
| 5,399,876 | 3/1995 | LaClair | 73/293 X |

FOREIGN PATENT DOCUMENTS

| | | | |
|---|---|---|---|
| 5055699 | 11/1991 | Netherlands | 250/577 |
| 4630476 | 3/1986 | United Kingdom | 73/293 |

*Primary Examiner*—Sandra L. O'Shea
*Assistant Examiner*—Elizabeth L. Dougherty

[57] ABSTRACT

An optical temperature compensated material level-interface sensing and control system which comprises an insertion probe (10), control circuitry and a housing enclosure (72). The probe (10) makes use of a pair of emitters and detectors, in which one pair is positioned across a channel (26) through which material passes and the other pair are mounted in a sealed tubular bracket. The first emitter and detector pair are optically active with respect to sensed material, and the other pair is optically isolated, but thermally active. The resulting signal is a function of the material's linear coefficient of absorption with the thermal influence being effectively canceled out. The outputs of the control circuit are user selectable and changeable. The device is able to detect material presence and identity for use in interface-level control applications through a wide range of pressures and temperatures in industrial applications.

5 Claims, 6 Drawing Sheets

MATERIAL LEVEL-INTERFACE CONTROL SYSTEM

BACKGROUND OF THE INVENTION

A. Field of the Invention

The present invention generally relates to optical sensing means and particularly to temperature compensated sensing systems adapted for use in level-interface controllers and the like thereof.

B. Description of Prior Art

Several devices have heretofore been proposed and made commercially available for indicating level of material and the point of interface between materials in vessels or conduit. Some of the operation principles that these devices incorporate are: capacitance, floatation, paddle wheel, tuning fork, thermal sensing, and optical sensing.

U.S. Pat. No. 4,499,766 discloses a material level indicating device which uses a capacitive probe positioned within a vessel so that the electrical, and particularly the dielectric, characteristics sensed by the probe are indicative of the material being sensed. Capactive systems are typically used only in liquid level applications and are not usually available for extreme or fluctuating temperature service.

Another level measuring system incorporates a float that works on the principle of buoyancy. The liquid level fluctuations within the vessel cause the float to rise and fall between two or more user selected set points. When the float comes into contact with one of these set points a connection is made and an output is generated. Various means have been developed for interfacing the output indication and the float probe, which is typically inserted into a vessel. They typically include inductive, mechanical, or a similar linkage. This floatation design is plagued by linkage failure, particularly in sticky or viscous materials. It is also useful only in measuring liquid levels and can not be used in conduit or piping where the material is flowing or in interface detection.

Another device which makes use of a paddle wheel is inserted into a vessel in order to measure level and/or density. The paddle is normally connected to a motor which rotates it. This rotation is slowed or stopped when a material is present at the paddle, thus indicating the material's presence at that point. The paddle design is greatly hampered by mechanical failure, particularly due to the stress on the motor. In adddition, the design does not allow for sensing in flowing conduits and is not a reliable interface sensing system.

U.S. Pat. No. 3,625,058 discloses a device which utilizes a tuning fork to detect material level in a vessel. The fork is vibrated by a motor, an oscillating electromagnetic field, or some other similar active means. When different materials reach the fork the vibration changes are detected by sensing circuitry which recognizes a change in material density. The tuning fork design is useful only in vessels and is not accurate enough to give reliable interface measurements in most liquid applications, particularly when the viscosity of the various materials being detected is similar.

Thermal device designs have also been proposed to measure level and interface, particularly when the materials being sensed possess large variations in their thermal properties. As such, thermal designs make use of a probe which is inserted into a vessel at a desired point of measurement. Typically, the probe contains a heating element and temperature sensing element. When material reaches the probe tip, a temperature differential is produced due to the materials thermal conduction/dissipation properties. This differential causes the generation of a corresponding output signal external of the vessel which indicates the material level and/or identity. Although the design incorporates no moving parts, the heating elements themselves are prone to burn out failure. Furthermore, due to the time required for the slight temperature differentials involved to conduct through the probe, the response time for thermal sensing devices can be extremely long. This response time delay often makes the thermal design unusable, especially in real-time control loops and other time critical applications. Finally, the device can not be used for interface in a conduit where the material is flowing due to extremely rapid thermal dissipation. It is this principle that has led to the use of similar thermal designs in flow metering applications.

In the particular field of art where light is used, designs typically make use of differing indexes of refraction, such as U.S. Pat. No. 5,055,699, or incorporate reflective properties in design of the sensor assembly as in U.S. Pat. No. 5,164,606. These devices usually make use of glass, quartz, optical fiber, or similar light transmitters in which light generated from external of the vessel is piped/transmitted through the light transmitter. Depending upon the material's refractive index, the light either will or will not be reflected back to a light sensing element. Additionally, U.S. Pat. No. 4,694,161 shows a device in which optical fiber is used only as a convenient way of signaling a mechanically induced condition. Such a scheme does not, however, offer a technique for precisely detecting interface between materials, nor is it typically suitable for extreme industrial environments involving high pressure and temperature. The current light sensing assemblies do not account for variations in process and material temperature which degrades the accuracy of the sensing device.

It is well known that both photodiodes and photoresistors are affected by changes in temperature. Therefore, it would be desirable to have a sensing system which could detect material level and interface between materials that would be usable in extreme industrial environments and be accurate over a wide temperature range. Additionally, it would be desirable for such a system to be usable in conduits or piping in which the material being sensed is flowing, and for both solid and fluid service.

SUMMARY OF THE INVENTION

The aforementioned needs are satisfied by the optical, temperature compensated material level-interface control system herein summarized. The system typically comprises one or several sensor probe heads, electrical control circuitry, and a housing enclosure for the circuitry. Additionally, various accessory fixtures such as flanges and thread mounting connectors may be provided.

The principle object of this invention is thus, to improve upon the prior art by disclosing a material level-interface sensing control system that utilizes no moving parts, fiber optics, or glass-like tubes, but which uses two light emitters paired with two light detectors that are encased in a durable probe assembly. One emitter and detector pair are engaged optically with the sensed material and the second emitter and detector pair are positioned so as to be optically inactive with respect to the sensed material, yet thermally sensitive. This design has the effect of neutralizing or compensating for the fluid's thermal influence upon the sensed signal reading.

The invention employs a sturdily constructed probe head which optimizes use of the material sensing light emitter and detector by placing them facing each other, axially, across a channel through which light is transmitted and absorbed. Detection and identification of the material is determined by the unique optical-absorptive properties of that material and is measured as an electrical signal value by the light detector. This provides a single system which may be used with both solids and fluids in level sensing applications.

This invention further provides a level-interface sensing control system which may be used both in vessels and conduits and for both stationary and flowing materials. The system's resulting accuracy of output signal reading and response time to changing sensed material presence is extremely fast. Furthermore, the system incorporates user selectable outputs that may be changed or re-calibrated in the field of application. It is also adaptable to many mounting schemes so that it may be easily mounted in a wide variety of process connections, such as threaded or flanged mountings.

Therefore, the system consists of: a sensor probe head, which is inserted into vessel or conduit where the material is located; an electrical control circuit, which has user selectable outputs; and an enclosure housing, which protects the control circuitry. Additionally, the probe head may have a flange mount or thread mount affixed for use in a variety of process connections.

Thus the advantages of such a sensing control system would be its ability to be used in either interface or level application, improved accuracy in fluctuating and extreme temperatures, easily selectable and changeable set points, simple and inexpensive installation procedure, long service life, and ability to accurately sense both solid and fluid materials. Further objects and advantages of the invention will become apparent from a consideration of the drawings and ensuing description of them.

BRIEF DESCRIPTION OF THE DRAWINGS

The invention, together with additional objects, features, and advantages thereof, will be best understood from the following description.

DESCRIPTION OF THE PREFERRED EMBODIMENTS

Figure 1:
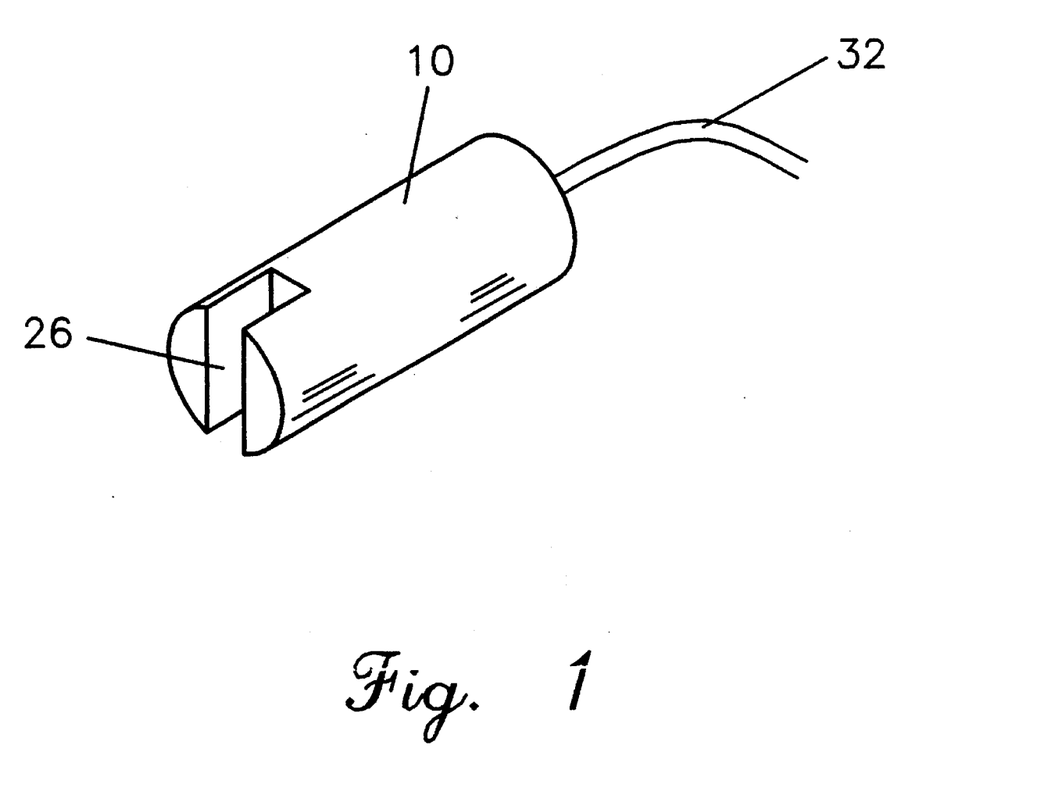
FIG. 1 is an external isometric view of the probe

Now referring more particularly to FIG. 1. which illustrates an external view of a probe 10 which is made of a hard, durable, thermally resilient, corrosion resistant, tubular material, such as stainless steel pipe or high density polyethylene. A channel 26, which is wide enough to allow a variety of materials, including solids, powders, and liquids, to pass through, is cut or otherwise fabricated into probe 10. A shielded multiconductor electrical cable 32 connects probe 10's internal sensing elements to an external control circuit, particularly the preferred circuit embodiment.

Figure 2:
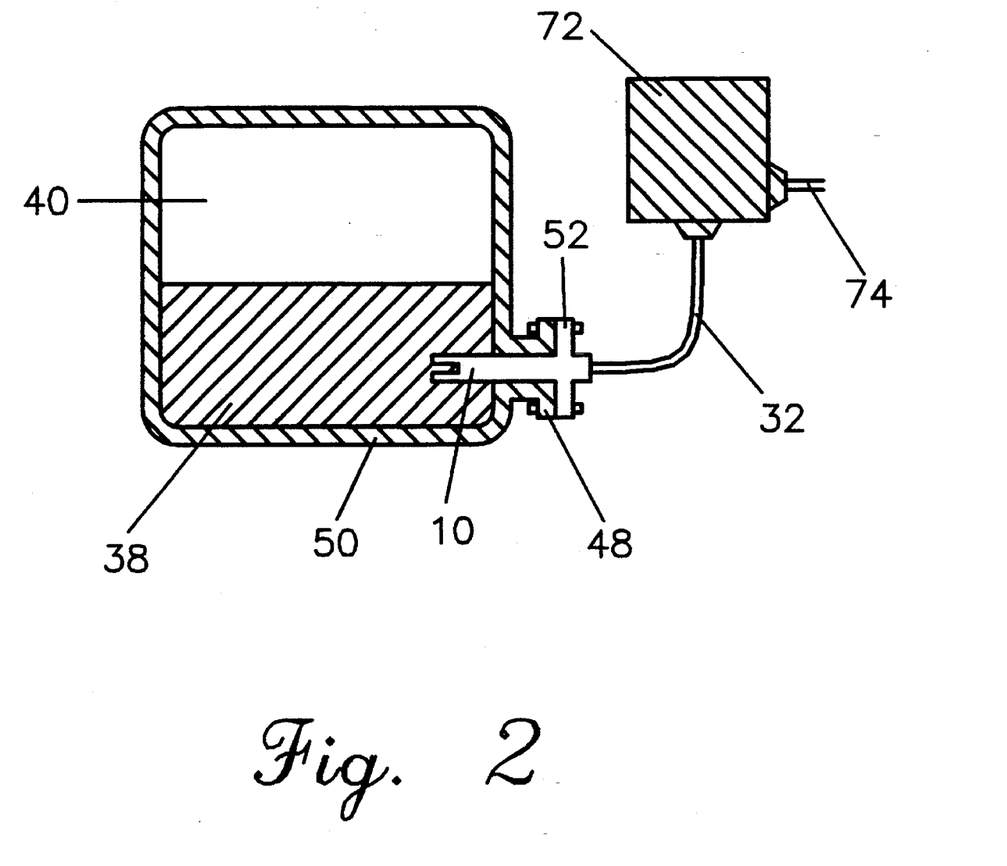
FIG. 2 is a cross sectional side view of one preferred embodiment of the invention wherein the sensor probe head is installed in a vessel

FIG. 2 illustrates one presently preferable embodiment of the invention comprising probe 10 which is mounted on a vessel 50 by means of a flange mount 52 that is welded or otherwise attached to probe 10. Flange mount 52 then connects to a flange mount 48 on the vessel. This arrangement allows the invention to be used in high pressure thick walled vessels to detect either level of material 38 or the interface between material 38 and material 40 where the materials 38 and 40 are optically dissimilar in terms of absorbency of light energy. Multiconductor electrical wire 32 connects probe 10 sensing elements to an external circuit housing 72, which has a power/output wire connection terminals 74 that facilitate integration with other external control system components.

Figure 3:
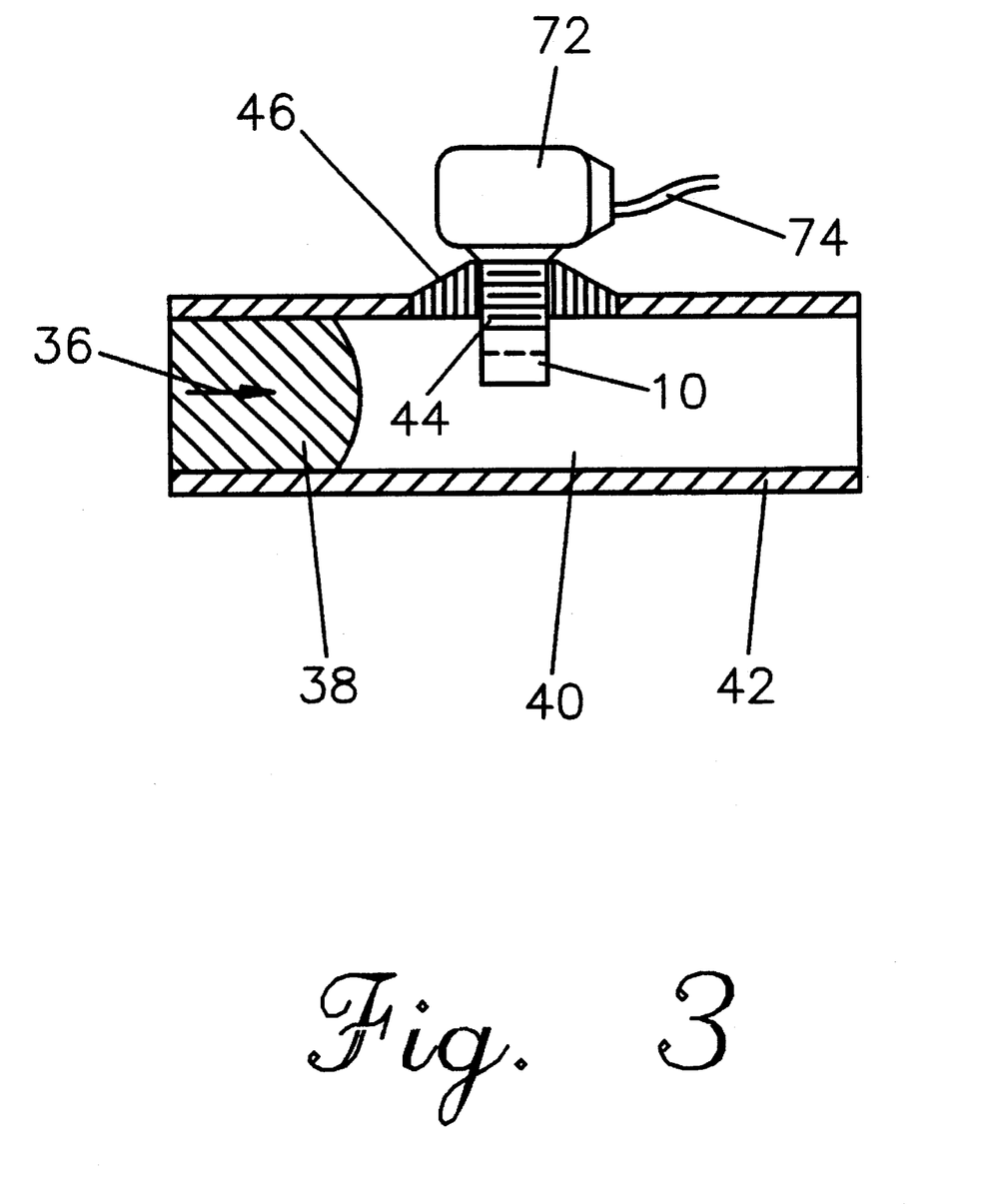
FIG. 3 is a cross sectional view of another preferred embodimen of the invention where it is used in a flowing material detection application

FIG. 3 illustrates another presently preferable embodiment of the invention in which probe 10 is mounted to a conduit, piping 42, or the like by means of a threaded connection 44 that is cut into probe 10 or added to uncut probe 10 by welding, brazing, or some similar process. Thread connection 44 screws are threaded into threaded mounting pipe nipple 46 which is jointed to the conduit 42. In this embodiment the invention is able to detect a change from material 40 in conduit 42 to a different material 38 which is optically dissimilar and flowing at some velocity 36. Multiconductor wire 74 connects power and output signals to electronics housing 72 which is affixed to the external end of probe 10.

Figure 4:
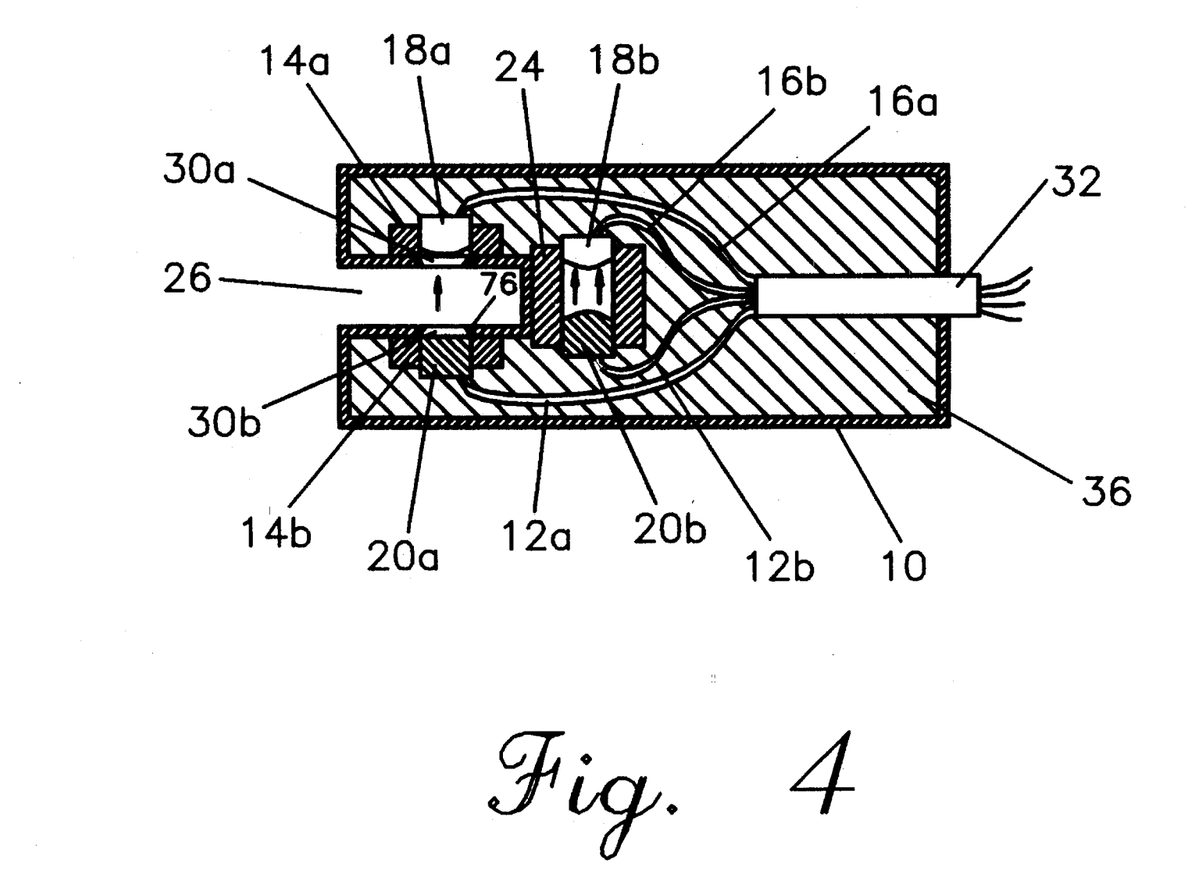
FIG. 4 is a cross sectional view of the sensor probe head

FIG. 4 shows a cross sectional view of probe 10. The invention is temperature compensated so that fluctuating process or material temperature does not affect accuracy of the sensing system. This is accomplished by having tubing in which a channel or gap 26 is created. Transparent windows 30a and 30b are made of a high temperature glass such as 96% fused silica or other similar material. Two beveled holes are drilled into the sides of channel 26 and windows 30a and 30b are inserted and secured into the holes in channel 26. Windows 30a and 30b are held in place by having them beveled to the same angle as holes in channel 26 and also by using a thermally resilient adhesive sealant 76 such as silicon, epoxy, or the like on the contact edges between windows 30a and 30b and sides of channel 26. Behind windows 30a and 30b are a light emitter 20a and detector 18a which are mounted in circular, hollow mounting ring brackets 14a and 14b. Mounting brackets 14a and 14b are thermally resilient and may be constructed of the same material as the tubing to facilitate better bonding between them. Mounting brackets 14a and 14b are bonded to channel side 26 by welding, brazing, or similar adhesive means, such that they press into windows 30a and 30b, which enhances the seal between windows 30a and 30b and channel 26. Light emitter 20a and detector 18a have electrical lead wires 12a and 16a which are connected to external multiconductor cable 32 by soldering, crimp connectors or similar bonding means. A second pair of emitter 20b and detector 18b are optically isolated from material being sensed by being mounted into a tubular ring mounting bracket 24 which does not allow external light or material presence to effect the enclosed pair. Therefore, emitter 20b and detector 18b are thermally active with respect to temperatures induced in probe 10 by material or process temperature but are not affected by material presence. Emitter 20b and detector 18b are inserted facing each other into a tubular mounting bracket 24 which is affixed to the interior end of channel 26 by welding, bonding or use of similar adhesive means used to attach mounting brackets 14a and 14b. Light emitter 20b and 18b have leads 12b and 16b which are connected to external wiring 32 by the same means as emitter 20a and detector 18a. This ensures equal electrical and thermal effects on sensed signal. Probe 10 has a thermally resilient filling sealant 36, such as epoxy, silicon, or the like, which serves to hermetically seal the interior components of probe 10 and to prevent external leakage in high pressure applications.

Figure 5:
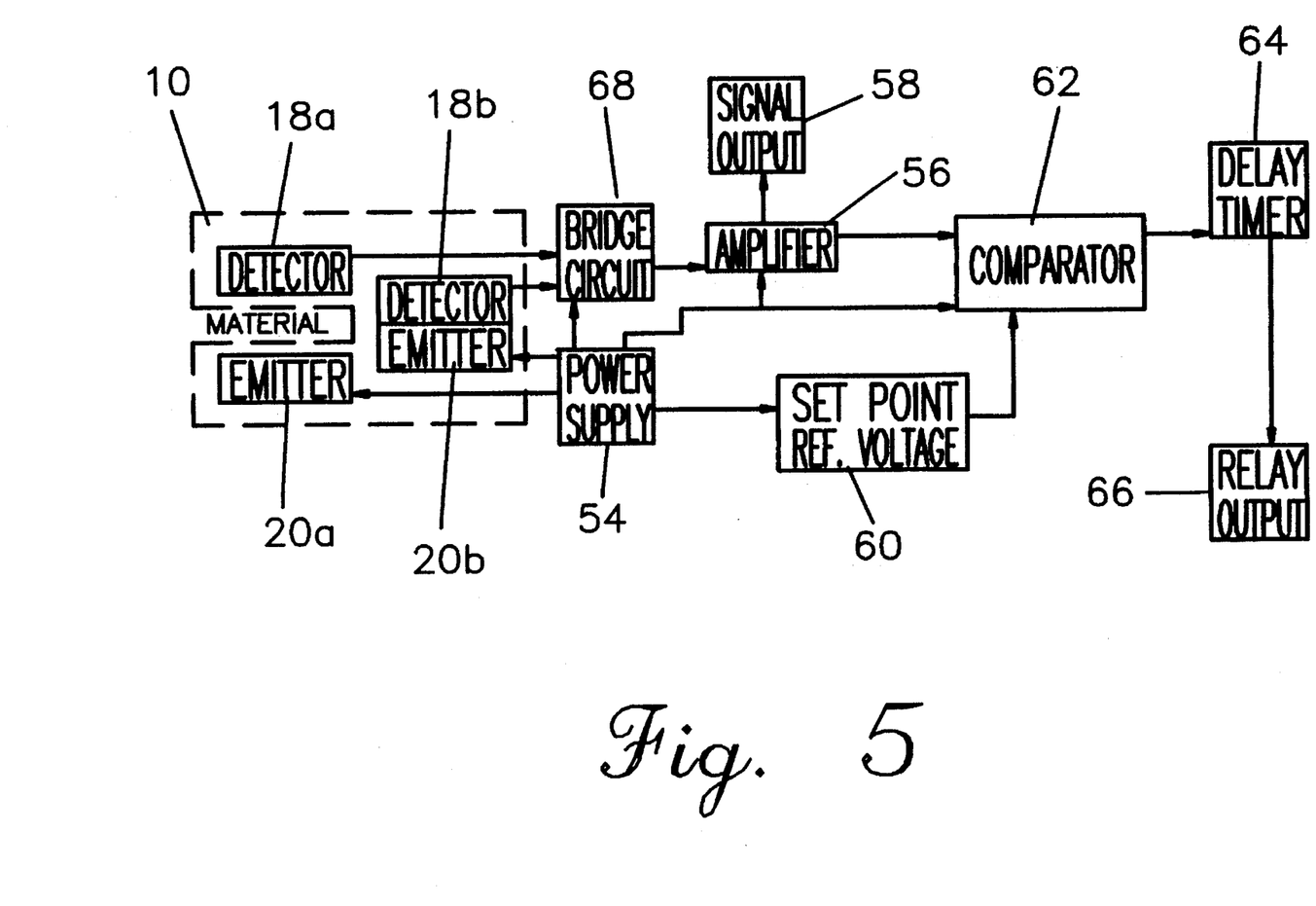
FIG. 5 is a functional block diagram of one presently preferable circuit embodiment

FIG. 5 illustrates a block diagram of a presently preferred circuit configuration in which probe 10 is in contact with material being sensed and where light energy is emitted from emitter 20a and travels through material. Some of the light energy is absorbed by the material while the remaining light is detected by detector 18a. The intensity of the light received through materials may be related by the Lambert-Beer laws of absorption which state: I=Io ln(us) where I is intensity of light received through a distant s of the material which has a linear absorption coefficient of u from original intensity of light Io emitted. Thus, the signal generated from a bridge circuit 68 varies with the linear absorption coefficient of the material. However, due to the effects of temperature on the operation of the emitter 20a and detector 18a, the signal generated by them must be compensated for by the addition of another pair of emitter 20b and detector 18b which are positioned in probe 10 so that they are optically isolated from the material being sensed but are thermally sensitive to the same degree as the first pair of emitter 20a and detector 18a. Therefore, the temperature variations are effectively canceled out by bridge 68. This will be explained in more detail in reference to FIG. 6. The resulting differential signal is then amplified by an amplifier 56. At this point an output signal 58 may be generated that is proportional to the material's linear absorption coefficient. Additionally, the signal may be applied to a comparator 62 which may be set by a user adjustable set point reference voltage 60. Comparator 62 output may then be fed into a delay timing circuit 64 and then finally to a relay switch 66. Relay switch 64 may be connected to any desired auxiliary device, such as a light or alarm, or to a secondary operational circuit, such as one activating a standby pump or automated valve system. A power circuit 54 is regulated and would typically be available with several possible input supply voltages to suit many different application environments.

Figure 6:
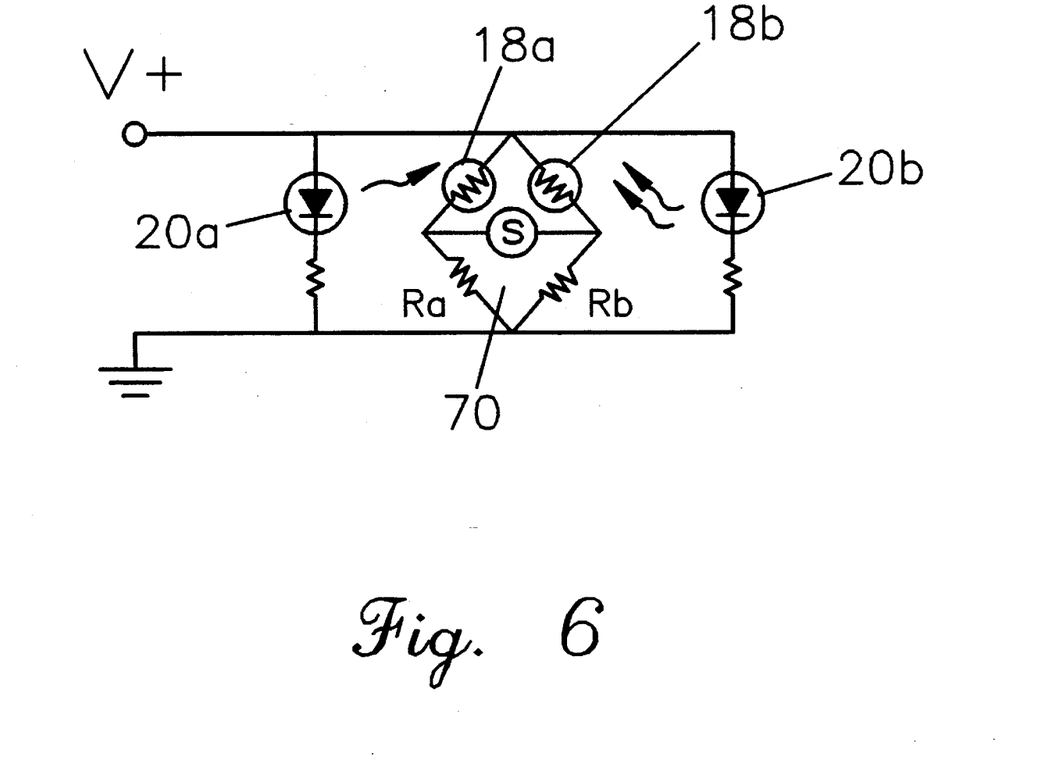
FIG. 6 is a electrical schematic of one preferred temperature compensating circuit embodiment

Now referring more particularly to FIG. 6 which illustrates a wheatstone bridge circuit 68 in which material detector 18a is a photoresistor located on one upper arm of the bridge and materially isolated detector 18b is on the other upper arm. The resulting signal, in this case a voltage 70, is therefore generated by the difference between each half of bridge 68 such that voltage 70 is a function of the ratio of resistance across bridge 68. Thus, the resistance value for detector 18a is a function of the intensity of light transmitted through material plus a given thermal effect. The resistance value for detector 18b is a function of the intensity of light generated by emitter 20b, which is constant, plus the same thermal effect. Also, any thermal effects on emitter 20a effects emitter 20b equally. Therefore, if emitters 20a,b and detectors 18a,b are closely matched with respect to thermal drift, experimentation has shown that the output signal 70 will be given by:

$V_{out} = V_{in}[(Ra/Ra + R18a) - (Rb/Rb + R18b)]$, where
$R18a = R$ emitter light intensity $- R$ material absorption $+ R$ thermal induced
$R18b = R$ emitter light intensity $+ R$ thermal induced Therefore resistance due to temperature induced is canceled out and the only variable which effects the signal voltage 70 is the material's linear coefficient of absorption. Furthermore, resistor Rb may be selected so that the signal voltage 70 has a value of near zero at the lowest possible indication point, thus providing a means to zero the system for differing applications.

Thus, with the present temperature compensated sensing system, one may accurately detect the presence and or identity of a material in contact with the probe over a wide temperature range in the full spectrum of applications including solids and fluids and stagnant or flowing materials. With knowledge of the linear coefficient of absorption for various materials and the effects of temperature on the sensing elements, the invention may be accurately calibrated before being placed in service and may also be tested for correct operation once in the field. By generating such data, the invention may also be used in qualitative applications such as a colorimeter, densimeter, mixing controller or the like when optical absorbency is a factor in the application process. Numerous other applications may be satisfied by other configurations which would not be limited by the preferred embodiments already discussed. All such changes and modifications as are within the scope of the claims and form part of the present invention. Therefore, although the description above contains many specifities, these should not be construed as limiting the scope of the invention but as merely providing illustrations of some presently preferred embodiments of this invention. For example, the light emitter and detector functions could just as easily be performed by incandescent or neon bulbs and photo diodes or phototransisitors, respectively, with little modification to the probe or circuit designs shown. Additionally, digital control circuitry or an array of sensor probes used to form a continuous level measuring system would be obvious substitutions to the analog, single probe example given previously. Therefore, the scope of the invention should be determined by the claims and their legal equivalents, rather than by the example given.

What is claimed and desired to be secured by Letters Patent is:

1. A system for sensing material level and interface in a vessel or conduit comprising:

a. a sensor assembly wherein a light emitter communicating with a light detector are apositioned each other, axially, across a channel separating said light emitter and said light detector wherein said light detector provides a means for signaling a value which is a function of material presence within said channel and the intensity of light radiated from said light emitter across said channel through said material to said light detector;

b. a means of housing said light emitter and said light detector to act as a probe for insertion into vessel or conduit;

c. a means of compensating for the effects of thermal fluctuations in the sensed material on said light emitter and said light detector wherein a second light emitter and light detector are affixed within the interior of said probe, apositioned to each other, whereby said light emitter and said light detector are optically isolated from sensed material, yet thermally active;

d. a means of determining an amount of light energy absorbed in said channel by sensed material, wherein said value of said light energy serves as an input value;

e. a means of providing an output upon condition of said material presence at said sensor assembly, whereby said output is generated and changeable with respect to sensed material.

2. The system of claim 1 wherein said probe is comprised of an elongated cylindrical shaft with a section of the end of said shaft that is inserted into vessel or conduit cut out parallel to the length of said shaft and forming a perpendicular bisector to said axis of said light emitter and said light detector to form said channel.

3. The system of claim 2 wherein said channel is large enough to permit sensed material to pass freely through and absorb a portion of said light energy radiated from said light emitter to said light detector.

4. The system of claim 2 wherein the walls of said channel are constructed of a resilient, pellucid material which acts as a window wherein said light energy is transmitted from said light emitter across said channel to said light detector.

5. The system of claim 2 wherein the inside of said cylindrical shaft is hermetically sealed with a thermally resilient sealant.

* * * * *